Patented Jan. 27, 1942

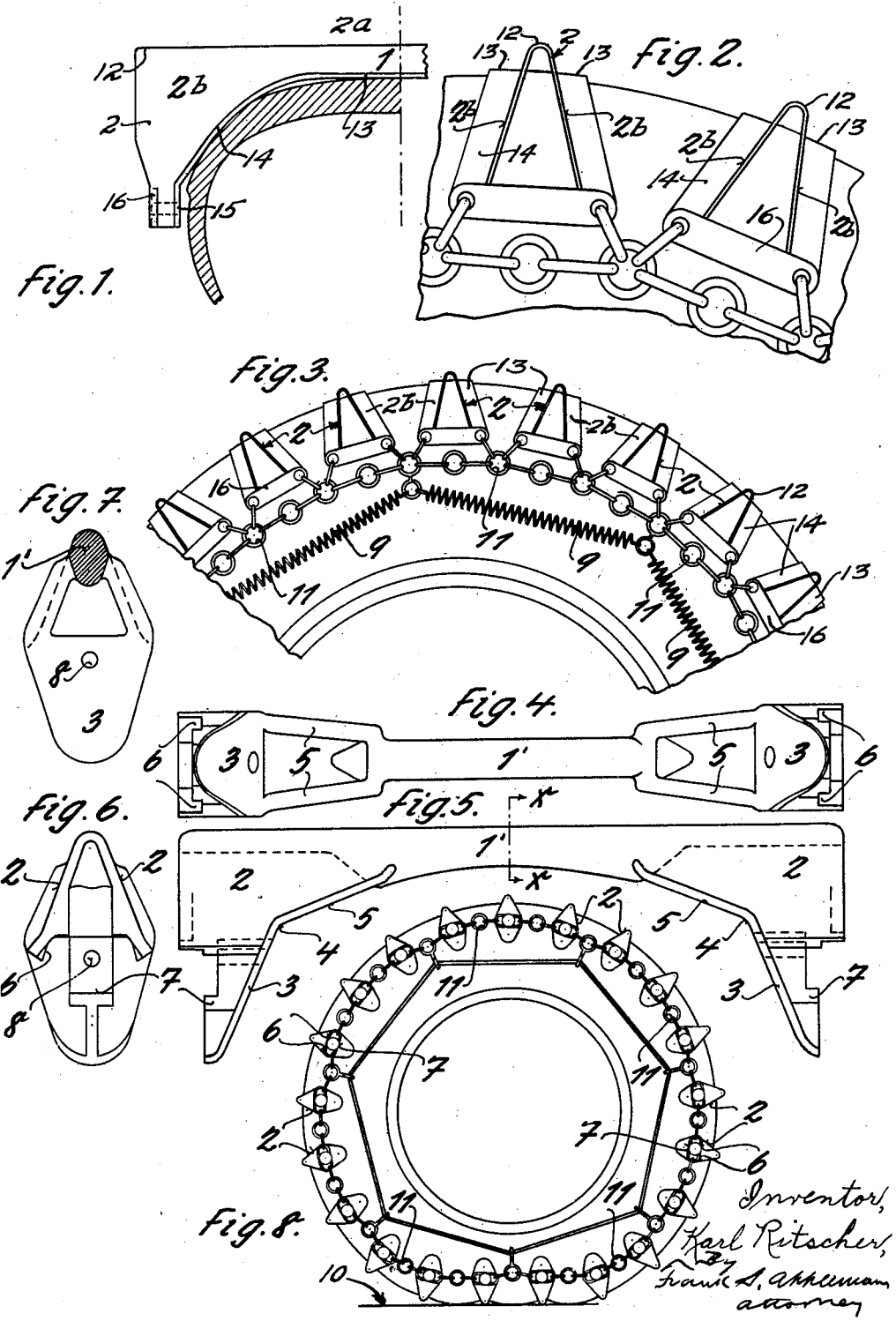

2,271,275

UNITED STATES PATENT OFFICE 2,271,275

ANTISKID DEVICE

Karl Ritscher, Hamburg-Moorburg, Germany

Application February 23, 1939, Serial No. 258,050
In Germany June 29, 1936

1 Claim. (Cl. 152—228)

The present invention refers to drag chains and drag chain members for tires. Drag chain members for tires are already known in the most varied shapes. In the majority of cases the well-known suggestions refer to drag chain members the base of which is developed as a plate, that is, shoe-shaped. With all these shapes, no matter whether they lie within the profile of the tire or extend more or less beyond it, a gripping effect cannot be attained in the manner desired, because the broad base does not permit the gripping member to sink into the ground and consequently does not satisfy one of the fundamental conditions that must be satisfied by a gripping member in order to increase the gripping surface on the ground. Further disadvantages of those shapes are that the gripping members cannot adapt themselves to the tire profile, because they are so broad and cannot press down into the profile or into the projections on it. Therefore in these profiles they cannot be prevented from slipping in the direction of the circumference. Finally, such gripping members have a disadvantage in that when the vehicle is used on a level track, for the same reasons the gripping members are not able to adapt themselves to the circumference of the tire profile in such a manner as to form, so to speak, no projections on the tire, that is, to be embedded in the tire profile as is necessary in such cases if the driving is to be as smooth and silent as possible.

All these disadvantages are eliminated by the gripping member which is the subject of the present invention and which, contrary to the shapes mentioned above, has its basis origin in a bar, so that the working surfaces lie at the extremities of bars lying across the tires and, being in axial planes, have surfaces projecting considerably beyond the sides of the tire profiles, which are attached to the bars on both sides. In a further finish the invention consists further in the lateral working surfaces lying in the axial planes being made V-shaped. Furthermore, the inner guiding surfaces, which are flatter towards the inside, serve to hold the gripping member in a secure position, besides which on the inner side of the gripping member there are obliquely rising lateral limiting surfaces that prevent the tire from climbing up out of the gripping member.

In one finish, as an example, the invention is described in the accompanying drawing, which shows:

Fig. 1 a front view of such a gripping member,

Fig. 2 a side view on the tire,

Fig. 3 the arrangement of a whole row of these gripping members on a tire and their use together with a tension spring, Fig. 4 a modification of the gripping member in the plan on the inner part, Fig. 5 a front view of the raised gripping member, Fig. 6 a side view, Fig. 7 a section according to line $x$—$x$ in Fig. 5, Fig. 8 a side view of a tire with the gripping members graphically indicated on it.

In the figures the individual reference marks indicate the following parts:

At 1 in Figs. 1, 2 and 3 and at 1' in Figs. 4, 5 and 7 there is shown a connecting bar making contact with a tire in the middle and these bars are of a size chosen in proportion to that of the tire in such a way as to enable the low-pressure tire to press through it in order to give rise, as far as possible, to no differences in height and vibrations on a level track.

The bar 1 includes a V-shaped member having a rounded edge 12 extending in a straight line from end to end of the bar. The sides 2 of the V-shaped member extend divergingly from the edge 12 and at the central portion 2a are of uniform height, while at each end portion 2b these diverging sides gradually deepen toward the extremities of the bar. The tire contacting edges of the portions 2a have flange portions 13 parallel to the edge 12 and these flanges continue from each end in downwardly curved and extending flange portions 14 and terminate in end portions 15 perpendicular to the edge 12. Ties 16 connect the lower edges of the portions 2b.

The lateral adjacent surfaces are to be seen at 3 (Fig. 5), a material feature being that at 4 there is an approximately right-angled bend which prevents lateral climbing of the tire during the work.

At 5 (Fig. 4) there is shown the contact surfaces of the tire on the gripping member, by which the tire prevents absolutely the tilting of the gripping member. At 6 and 7 we see the three supports where, as shown in Fig. 6, the connecting links of the chain can rest, to be held between them as if in tongs and be protected from any rotary motion. At 8 is the bore for the fastening bolt for the chain. From Fig. 8 it is seen that for instance the circumfeernce of the tire takes twenty-one chain members, so that when the tire is motionless, for example, two members have their contacting surface on the track 10.

The whole parts are formed as one single part, e. g., as one single casting.

In Fig. 3 there is shown at 9 an elastic automatic tension contrivance, such as a tension spring, which tightens the fastening chain 11 in a particularly favorable manner.

What I claim is:

A cross member for anti-skid devices including a bar adapted to extend transversely of the tire and of generally V-shape with a rounded ground contacting edge and diverging sides, said rounded edge extending from end to end of the bar, the sides of said bar having a relatively narrow central portion and having their end portions increasing in depth from the central portion to the extremity of the bar, the basal edges of said bar having outwardly extending flanges extending from end to end of said edges, and ties connecting the flanged portions at each end of the bar.

KARL RITSCHER.